Patented Aug. 21, 1934

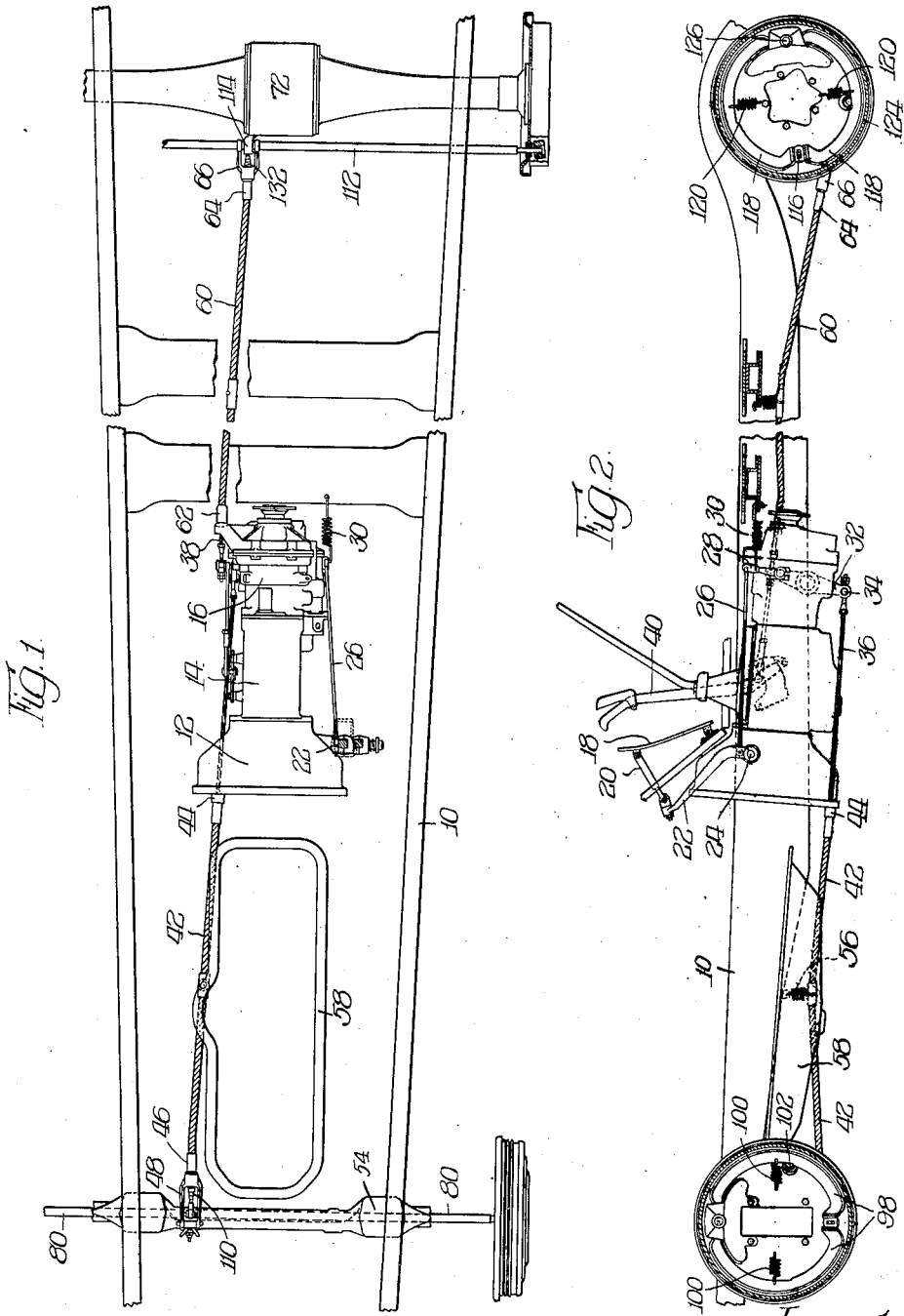

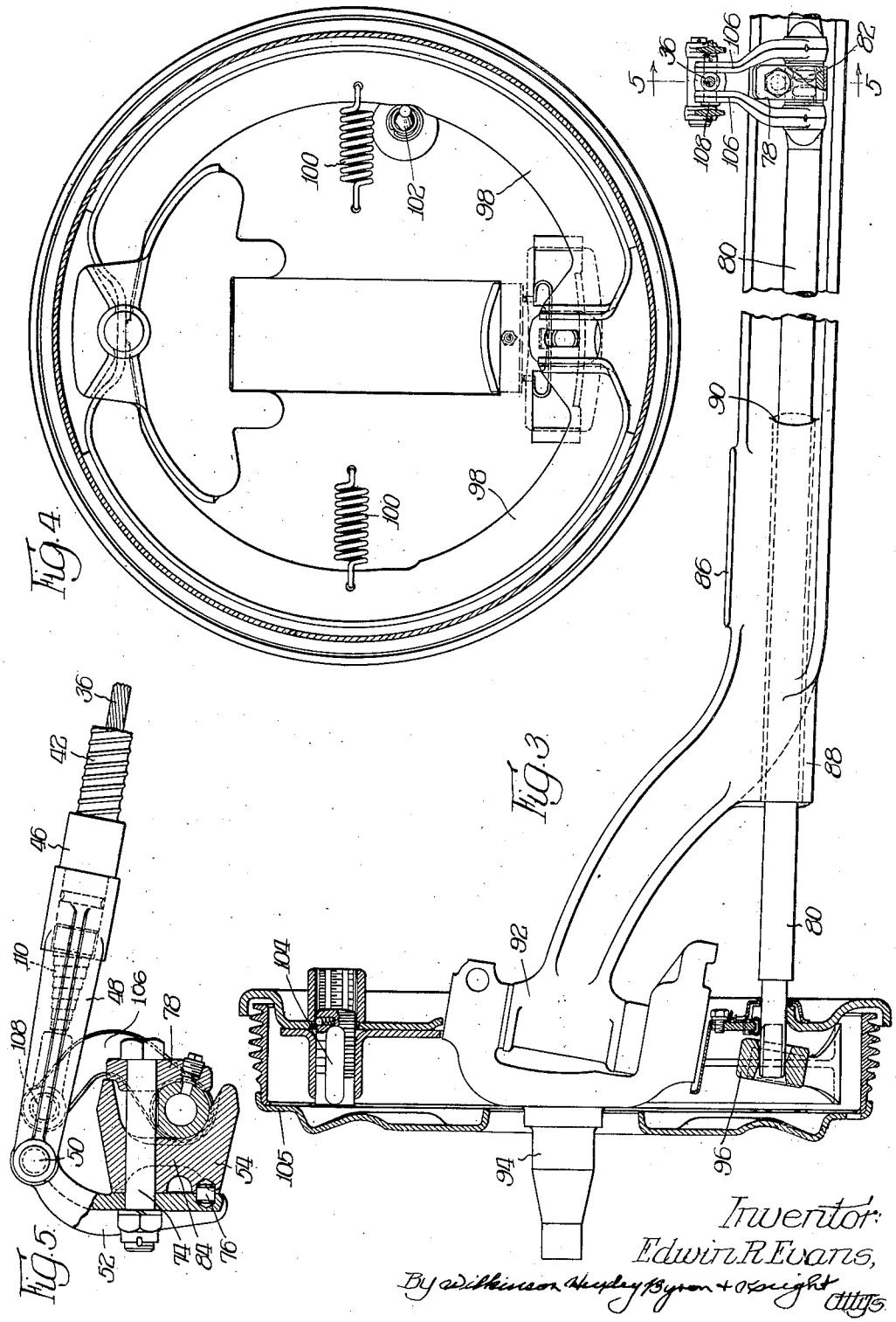

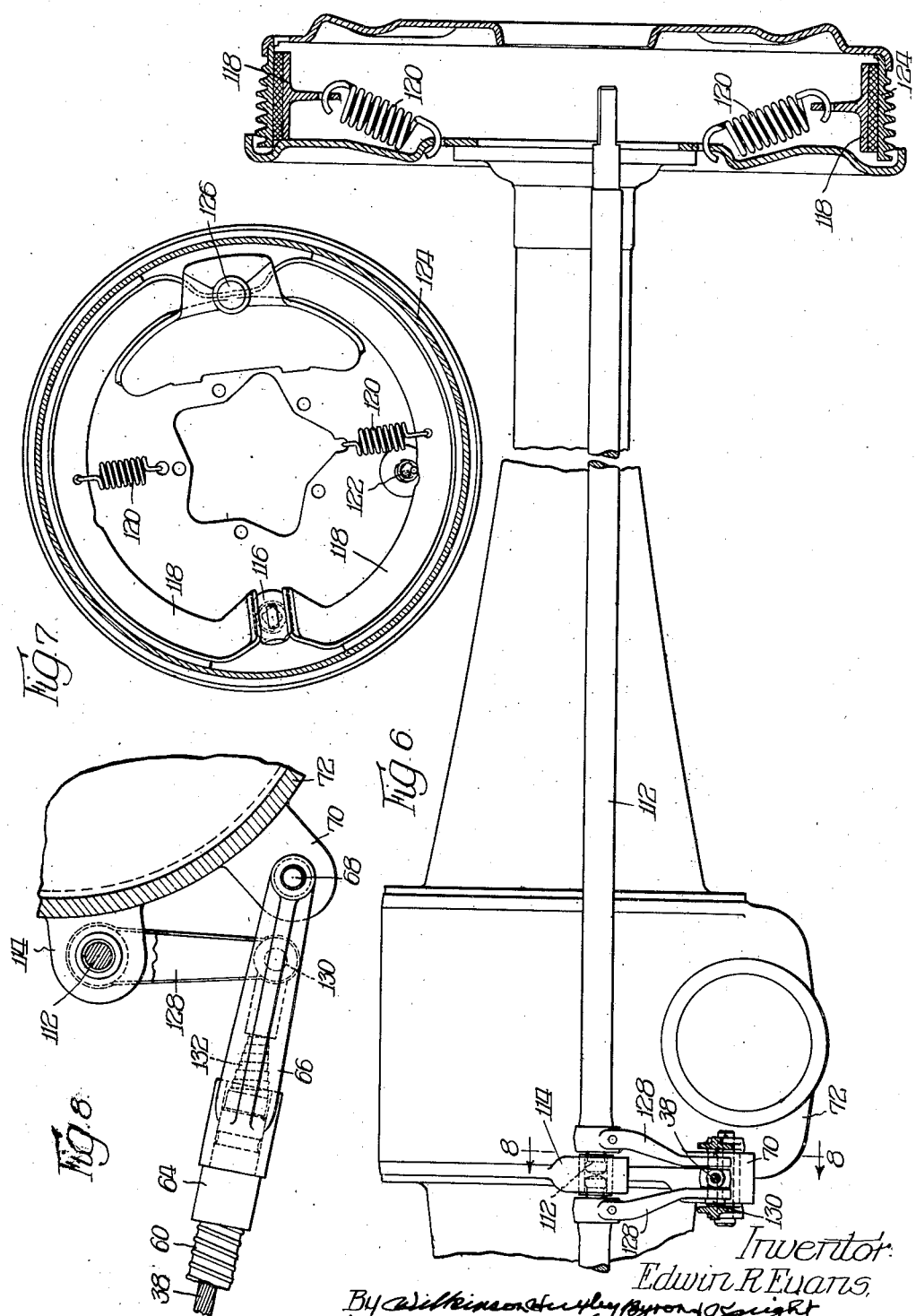

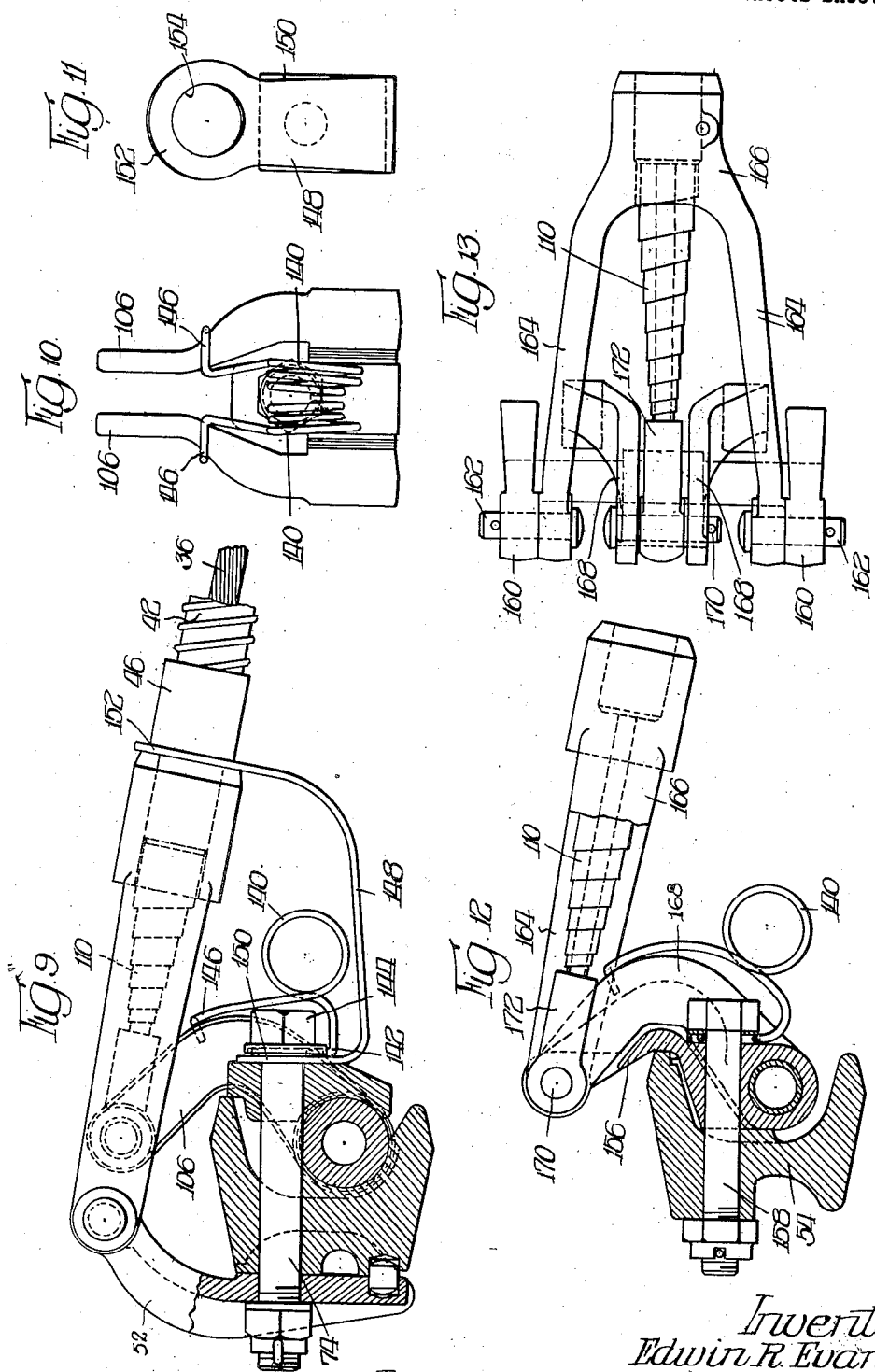

1,970,904

UNITED STATES PATENT OFFICE 1,970,904

BRAKE LINKAGE

Edwin R. Evans, Chicago, Ill.

Application January 7, 1933, Serial No. 650,660

11 Claims. (Cl. 188—10)

This invention relates to improvements in a brake linkage for motor vehicles and more particularly to a brake linkage in which cable and conduit connections are employed.

The present invention is an improvement over my previous disclosure in application, Serial No. 583,299, filed December 26, 1931. In this prior application brake actuating rock shafts are pivotally supported at their inner ends on the axle and have formed thereon lever arms to which the brake actuating cable is connected. The flexible inextensible cable conduit is fixed to an abutment on a bracket which is mounted on the axle but it will be noted that the point at which the cable is connected to the levers is separated somewhat from the end of the cable conduit and this portion of the cable changes its line of direction during actuating movement. This may cause some binding action at the end of the cable conduit in spite of such flexing of the cable conduit as may occur.

It is a purpose of the present invention to disclose improvements which prevent any binding action of the cable adjacent the end of the cable conduit. This may be carried out by providing a yoke member which is fixed to the end of the cable conduit to constitute an extension thereof and which is pivotally supported upon a bracket on the axle at a point spaced from the end of the cable conduit, while the lever arms which are carried by the rock shafts extend between the sides of the yoke member and are there connected to the cable. It will, therefore, be understood that during actuating movement the rigid extension of the cable conduit rocks about its pivot point as the angle of the cable with respect to the lever arms changes.

Further objects and advantages of the present improvements will be more readily apparent from the following description taken in connection with the attached drawings in which a preferred embodiment of my invention is illustrated.

Figure 1 is a partial plan view of a chassis showing the brake linkage;

Figure 2 is an elevation partially in section of the chassis;

Figure 3 is a view taken in elevation looking forward towards the front axle, the brake drum being shown in section;

Figure 4 is a section taken through the front brake drum and showing the parts of the wheel brake;

Figure 5 is a vertical section taken on the plane indicated 5—5 in Figure 3;

Figure 6 is an elevation looking rearwardly towards the rear axle and showing one of the rear wheel brakes in section;

Figure 7 is a section taken through the brake drum of a rear wheel brake and showing the parts of the wheel brake;

Figure 8 is a section taken on the plane indicated 8—8 in Figure 6;

Figure 9 is a view similar to Figure 5 but illustrating return springs for the rock shafts and a resilient supporting arm for the cable conduit;

Figure 10 is a detail view showing the cooperation of the return springs with the lever arms at the adjacent ends of the rock shafts;

Figure 11 is a detail end view of the resilient supporting arm for the cable conduit;

Figure 12 is a view similar to Figure 9 but illustrating a modified construction, and Figure 13 is a plan view of the construction shown in Figure 12.

In Figures 1 and 2, 10 is the chassis frame of the motor vehicle, 12 is the fly-wheel housing 14 is the transmission housing and 16 is the power brake housing. A brake pedal 18 actuates, through link 20, a lever 22 pivoted at 24. The lever 22 is connected by pull rod 26 to the input lever 28 of the power brake unit. These parts are held in normal released position by spring 30. On the opposite side of the power brake unit is a double arm output lever 32, which is connected at its lower end at 34 to the forwardly extending cable 36 and is connected at its upper end to the rearwardly extending cable 38. An emergency lever 40 is suitably connected by a lost motion link to the upper end of the output lever 32.

The front cable 36 extends through a flexible inextensible cable conduit 42 which is fixed at its rearward end to an abutment 44 carried by the housing 12. The abutment 46 for the forward end of the conduit 42 is fixed to a yoke member 48 which constitutes an extension of the conduit and is pivotally supported at 50 upon bracket 52 carried by the axle 54, as shown in detail in Figure 5. The conduit 42 is partially supported between its ends by the spring 56 which is connected to the conduit and to the crank case 58. The rear brake cable 38 extends through a cable conduit 60 which is fixed to its forward end to an abutment 62 rigid with the power brake housing and is connected at its rearward end to an abutment 64 fixed to a yoke 66 pivoted at 68 upon a bracket 70 formed on the differential housing 72.

Referring now to Figures 3 and 5 it will be noted that a bolt 74 secures the bracket 52 to the axle 54 and the bracket is additionally centered by a pin 76 at the lower end of the bracket cooperating with the axle. The bolt further serves to attach a bracket 78 on the opposite side of the axle which holds a bearing sleeve, as shown in Figure 3, to support the inner ends of a pair of rock shafts 80. The rock shafts have rounded bearing pins 82 fitting into the cylindrical opening of the bearing carried by the bracket 78.

It will be noted from Figure 5 that the web 84 of the axle is offset with respect to the longitudinal center line of the axle to enable the pivot points for the rock shafts to be as close as possible to the center line of the axle. Adjacent the spring supports 86 upon the axle the rock shafts 80 pass into cylindrical housing portions 88 formed on the axle. The opening 90 in Figure 3 indicates an inner end of this housing portion 88. The housings 88 permit a certain degree of lateral movement of the rock shafts. Thus the outer ends of the axle are substantially beneath the pintle bearings 92 at the ends of the axle which support the swivelled wheel bearings 94.

In Figures 3 and 4 a brake cam 96 is shown slidably and rockably fitting on the end of the rock shaft 80. The cam 96 is held between the ends of a pair of brake shoes 98 normally held in released position by the springs 100 centered by the centralizer 102 with respect to brake drum 105 and supported at their upper ends by the adjusting wedge 104, all of which substantially corresponds to previous disclosures made by me.

Referring now more particularly to the cable and conduit connections to the rock shafts 80, it will be noted that the rock shafts have fixed to their inner ends upstanding levers 106 which are connected at their upper ends over the axle by a pin 108 to which is connected the end of cable 36. The cable 36 is enclosed between abutment 46 and pin 108 by an extensible spiral spring 110 which acts as a boot. From Figures 3 and 5 it will be noted that a pull upon cable 36 tends to rock the yoke 48 upon its pivot point 50 in such manner as to maintain the pivot point 108 at which the cable is connected to levers 106 substantially on the center line of the yoke, whereby, binding of the cable adjacent the abutment 46 is prevented. It will be understood that the conduit 42 is able to bend in such a manner as to take up or give out slack in the cable 36, due to relative movement of the axle 54 with respect to the housing parts 12, 14 and 16, upon which the brake operating parts are carried.

Referring now to Figures 6, 7 and 8 it will be noted that the rear wheel brakes are operated by rock shafts 112 pivotally supported at their inner ends upon a bearing bracket 114 fixed to the differential housing. Each of the rear wheel brakes, as shown in detail in Figure 7, includes a cam 116 actuated by the rock shaft and supported between a pair of brake shoes 118 held in normal released position by springs 120 centered by centralizer 122 with respect to the brake drum 124 and supported at their opposite ends by the adjusting anchor pin 126.

The rock shafts 112 are provided at their inner ends with depending lever arms 128 connected by pin 130 to which is connected the end of cable 38. The cable is enclosed by flexible housing 132. The operation is similar to that described with reference to the front wheel brakes since any pull upon the cable 38 will tend to rock the yoke member 66 about the pivot point 68 in such a manner as to maintain the pivot point 130 substantially on the center line of the yoke member and prevent any binding action of the cable adjacent the abutment 64.

In Figures 9 and 10 the construction is similar to that in Figure 5 except for the provision of additional elements. A pair of coil springs 140—140 are provided. One end 142 of each spring is clamped beneath the head 144 of bolt 74 and the other end 146 of each of the spring elements is hooked around one of the lever arms 106. The spring elements 140 therefore serve to normally hold the lever arms 106 and the rock shafts connected thereto in released positions. Also a resilient supporting arm 148 is provided, one end 150 of which is clamped beneath the head 144 of bolt 74 and the other end 152 of which has an opening 154 receiving the abutment 46 at the end of the cable conduit. The arm 148 acts as a resilient support for the end of the cable conduit to hold it against swinging movement due to the motion of the vehicle.

Figures 12 and 13 illustrate a modified arrangement for connecting the cable and conduit to the actuating means supported by the axle. The front axle 54 has a bracket 156 fastened thereto on the rear side by means of a bolt 158. The bracket is provided with upstanding arms 160—160 which receive pins 162 forming pivotal supports for the ends of arms 164 of the yoke-shaped supporting member 166 which constitutes an abutment for the cable conduit. The lever arms 168 are connected to the rock shafts which are rockably supported on the axle and are connected at their upper ends by pin 170 to the member 172 which is fastened to the end of the cable 36. Spring members 140 are employed similar to the showing in Figures 9 and 10. It will be noted in Figure 12 that in normal released position the pivot pin 170 is in line with pivot pins 162 whereby swinging of the cable conduit cannot cause any applying movement of the brakes. Therefore in this form the resilient supporting arm 148 shown in Figure 9 is not required. The end of the cable is enclosed by a spiral spring boot 110, the same as in Figure 5.

Thus, according to the present invention, when the operator applies the brake pedal 18, the power brake unit comes into action to cause movement of the output lever 32 which in turn pulls upon cables 36 and 38 to rock the shafts supported by the front and rear axles to apply the front and rear wheel brakes. During this actuating movement the rigid yoke members which constitute members of the cable conduits pivot upon their supporting points as the conduits receive the reactions from the pulls subjected to the cables. It will be understood that similar constructions may be employed to obtain the desired results in any place where cable and conduit connections are employed and various modifications may be resorted to without departing from the spirit of my invention as expressed in the appended claims.

I claim:

1. In a brake linkage, a flexible cable conduit, a member fixed to one end of said conduit constituting an extension thereof, a pivotal support for said member, the axis of said pivotal support being spaced from the flexible portion of said conduit, a pivoted brake actuating arm and a cable extending through said conduit and pivotally connected at one end to said arm, the portion of said cable between the flexible portion of said conduit and the pivotal connection to said arm being in line with the axis of the pivotal support for said member.

2. In a brake linkage, a flexible cable conduit, a member fixed to one end of said conduit and constituting an extension thereof, a fixed bracket, a pivotal support for said member upon said bracket, a pivoted brake actuating arm, a cable extending through said conduit and pivotally connected to said arm at a point spaced from the flexible portion of said conduit, said cable conduit and said extension member being free to swing to maintain the portion of said cable between the flexible portion of said conduit and said brake actuating arm in line with the pivot for the extension member of said conduit.

3. In a brake linkage, a flexible cable conduit, a rigid yoke member fixed to an end of said conduit and constituting an extension thereof, an axle, a pivotal support on said axle for said yoke member, a brake actuating arm pivotally supported on said axle, said arm extending between the sides of said yoke member and a brake actuating cable extending through said conduit and connected to said arm.

4. In a brake linkage, a flexible cable conduit, a rigid yoke member fixed to an end of said conduit and constituting an extension thereof, an axle, a pivotal support on said axle for said yoke member, a brake actuating rock shaft pivotally supported at one end on said axle, an arm fixed to the end of said rock shaft and a brake actuating cable extending through said conduit and connected to said arm at a point between the sides of said yoke member.

5. In a brake linkage, a flexible cable conduit, a rigid yoke member fixed to one end of said conduit and constituting an extension thereof, an axle, a pivotal support on said axle for said yoke member, a brake actuating arm pivotally supported on said axle, said arm extending between the sides of said yoke member and a brake actuating cable extending through said conduit and pivotally connected to said arm, the portion of said cable between the flexible portion of said conduit and the connection of said cable to said arm being maintained in line with the pivot for said yoke member during brake actuation through swinging movement of said yoke member.

6. In a brake linkage, a flexible cable conduit, a rigid yoke member fixed to one end of said conduit and constituting an extension thereof, an axle, a pivotal support on said axle for said yoke member, a pivoted brake actuating arm, said arm extending between the sides of said yoke member, a brake actuating cable extending through said conduit and connected to said arm and a resilient support carried by said axle for said cable conduit.

7. In a brake linkage, a flexible cable conduit, a rigid member fixed to an end of said conduit and constituting an extension thereof, said member having an open side, a pivotal support for said extension member spaced from the end of said conduit, a brake actuating arm and a cable extending through said conduit connected to said arm at a point intermediate said pivotal support and the end of said conduit.

8. In a brake linkage, a flexible cable conduit, a rigid yoke member fixed to an end of said conduit and constituting an extension thereof, a pivotal support for said yoke member at a point spaced from the end of said conduit, a brake actuating arm, the end of which extends between the sides of said yoke member and a brake actuating cable extending through the conduit and connected to said arm.

9. In a brake linkage for motor vehicles, a flexible cable conduit, a rigid yoke member fixed to an end of said conduit and constituting an extension thereof, a front axle, a bracket fixed to said axle and constituting a pivotal support for the end of said yoke member at a point above said axle, a pair of rock shafts pivotally supported at their inner adjacent ends upon said axle, a pair of lever arms fixed to the inner ends of said rock shafts and a cable extending through said conduit operably connected to said lever arms between the pivotal support for said yoke member and the end of said cable conduit.

10. In a brake linkage, a flexible cable conduit, an abutment member fixed to one end of said cable conduit and constituting one end thereof, a pivotal support for said member, a pivoted brake actuating arm and a tension member extending through said conduit and pivotally connected at one end to said arm, the portion of said tension member between the flexible conduit and the pivotal connection to said arm being substantially in the plane of the axis of the pivotal support for said member.

11. In a brake linkage, a compression member, a rigid member fixed to an end of said compression member and constituting an extension thereof, an axle, a pivotal support on said axle for said rigid member, a brake actuating arm pivotally supported on said axle, said arm extending adjacent a side of said rigid member and a brake actuating tension member extending through said compression member and connected to said arm.

EDWIN R. EVANS.